Patented July 16, 1946

2,404,213

UNITED STATES PATENT OFFICE 2,404,213

ROSIN CARBONATES

Joseph N. Borglin, Wilmington, Del., assignor to Hercules Powder Company, Wilmington, Del., a corporation of Delaware No Drawing. Application December 9, 1942, Serial No. 468,427

5 Claims. (Cl. 260—100)

This invention relates to a new composition of matter and to the process for obtaining it and particularly to a rosin carbonate.

In accordance with the present invention rosin alcohols and their alcoholates and esters may be reacted with a derivative of carbonic acid to produce rosin esters of carbonic acid. The rosin carbonates may contain two rosin groups and may be referred to as neutral rosin carbonates. The rosin carbonates may contain one rosin group and one alkyl, aryl, or aralkyl group and may be referred to as mixed neutral rosin carbonates. Again the rosin carbonates may contain one rosin group and one halo group and may be referred to as halo rosin carbonates.

The neutral and mixed neutral rosin carbonates may be prepared in general by means of an ester interchange wherein an ester of a rosin alcohol and a dialkyl carbonate are caused to be reacted together with or without the presence of an alkali metal alcoholate. Further, the neutral and mixed neutral rosin carbonates may be prepared by means of an alcohol interchange wherein a rosin alcohol and a dialkyl carbonate are caused to be reacted together in the presence of an effective amount of an alkali metal alcoholate as a catalyst. Again, these neutral and mixed neutral rosin carbonates may be prepared by means of an acid halide reaction wherein an acid halide as, for example, a halo formyl halide is caused to be reacted with an alkali metal rosin alcoholate or a rosin alcohol or wherein a halo formyl alkyl ester is caused to be reacted with an alkali metal rosin alcoholate or a rosin alcohol.

The halo rosin carbonates may be prepared, in general, by means of an acid halide reaction wherein an acid halide as, for example, a halo formyl halide is caused to be reacted with an alkali metal rosin alcoholate or a rosin alcohol, and wherein a halo formyl alkyl ester is caused to be reacted with an alkali metal rosin alcoholate or a rosin alcohol.

In general, the rosin alcohols and their esters and alcoholates that may be used in accordance with this invention may be derived from ordinary rosin and the specific rosin acid components thereof as, for example, abietic acid, sapinic acid, d-pimaric acid, l-pimaric acid, etc., also they may be derived from chemically modified rosin as, for example, polymerized wood, hydrogenated rosin, dehydrogenated rosin, rosin which has been subjected to a heat treatment at about 250° C. to about 350° C. and rosin which has been subjected to a heat treatment at about 100° C. to about 300° C. in the presence of a suitable catalyst.

The method in accordance with this invention is illustrated by the following specific examples, all parts and percentages being by weight unless otherwise specified:

Example 1

Fifty grams of hydrogenated abietyl alcohol were dissolved in 50 grams of xylene. Twenty grams of phosgene were passed through the solution for two hours at room temperature. An exothermic reaction took place resulting in the evolution of a relatively small amount of heat. The xylene was removed by means of vacuum distillation carried out at a maximum distillation temperature of 160° C. Forty-five grams of a brown semi-viscous, saponifiable liquid were obtained. The liquid contained about 63% of chlorohydroabietyl carbonate and about 37% hydroabietyl carbonate.

Each of the following examples was carried out in a manner substantially as described with reference to Example 1:

Table

| Ex. | Rosin alcohol, ester or alcoholate | Gr. used | Solvent | Gr. used | Carbonic acid derivative | Gr. used | Reaction | | Catalyst | Gr. used | Per cent yield of reaction product |
|---|---|---|---|---|---|---|---|---|---|---|---|
| | | | | | | | Time | Temp., °C. | | | |
| | | | | | | | Hours | | | | |
| 2 | Abietyl alcohol | 50 | Xylene | 50 | Diethyl ester | 100 | 7 | 150–180 | Sodium methylate | 2 | 65% tacky-semi-viscous liquid. |
| 3 | Polymerized rosin alcohol | 50 | ...do | 50 | Chloroethyl ester | 50 | 4 | 80–100 | | | 65% tacky-highly viscous liquid. |
| 4 | Sodium abietyl alcoholate | 50 | ...do | 50 | Phosgene | 20 | 2 | 30–50 | | | 75% tacky-soft-solid. |
| 5 | Sodium alcoholate of polymerized rosin | 50 | ...do | 50 | Dimethyl ester | 18 | 7 | 150–200 | | | 30% tacky-semi-viscous liquid. |
| 6 | Sodium alcoholate of hydrogenated rosin | 50 | ...do | 50 | Chloroethyl ester | 40 | 1 | 60–80 | | | 75% tacky-light colored semi-viscous liquid. |
| 7 | Acetate of polymerized rosin alcohol | 50 | ...do | 50 | Diethyl ester | 25 | 7 | 150–180 | Sodium methylate | 2 | 65% tacky-highly viscous liquid. |

Carbonic acid derivatives operable in accordance with the present invention are the esters having the general formula

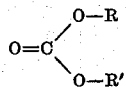

wherein R and R' are alkyl, aryl, or aralkyl radicals as, for example, methyl, ethyl, propyl, isoamyl, isobutyl, etc., and specifically diethyl carbonate, diisoamyl carbonate, diisobutyl carbonate, dimethyl carbonate, diphenyl carbonate, ethyl methyl carbonate, dibenzyl carbonate, etc.; halo formyl halides having the general formula

wherein X and X' are halogen radicals as, for example, chloro, bromo, etc., and specifically phosgene, bromo formyl bromide, chloro formyl bromide, bromo formyl chloride, etc.; halo alkyl esters having the general formula

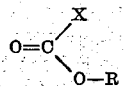

wherein X is a halogen radical as, for example, chloro, bromo, etc., and R is an alkyl radical as, for example, methyl, ethyl, propyl, isoamyl, etc., and specifically chloro ethyl carbonate, chloro methyl carbonate, bromo ethyl carbonate, bromo methyl carbonate, chloro propyl carbonate, chloro isopropyl carbonate, chloro isoamyl carbonate, etc.; and alkali metal salts represented by the general formula

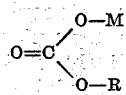

wherein M represents an alkali metal as, for example, sodium, potassium, lithium, etc., and wherein R represents an alkyl, aryl, or aralkyl radical.

The rosin alcohols and their ester and alcoholate derivatives operable in accordance with this invention may be prepared from any of the natural and chemically modified rosins by any of the methods well known in the art. Any one of the more than 50 different isomeric rosin acids may be treated according to methods well known in the art to produce the rosin alcohols and their ester and alcoholate derivatives.

Chemically modified rosins which may be treated in accordance with procedure well known in the art to form the chemically modified rosin alcohols and their ester and alcoholate derivatives may be any rosin which has been treated to modify its chemical structure. Rosins which fall within this general class are the hydrogenated rosins, the dehydrogenated rosins, the polymerized rosins, those rosins which have been heat treated at about 250° C. to about 350° C., those rosins which have been heat treated at about 100° C. to about 300° C. in the presence of a suitable catalyst, polymerized crystallized rosins, hydrogenated crystallized rosins, and heat treated crystallized rosins.

The mixed neutral and the neutral rosin carbonates may be prepared by means of an ester interchange wherein an ester of a rosin alcohol and an ester having the general formula

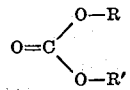

wherein R and R' are alkyl, aryl, or aralkyl radicals, are caused to be reacted together with or without the presence of an alkali metal alcoholate. The ester interchange reaction may be carried out by heating a rosin alcohol ester as, for example, rosin alcohol acetate with a dialkyl carbonate as, for example, diethyl carbonate in a suitable solvent, as for example, benzene, xylene, etc. The proportions of neutral and mixed neutral rosin carbonates formed depend in part upon the reaction time and temperature. Ordinarily, when the reaction is carried out at room temperature, a mixture of neutral and mixed neutral rosin carbonates are formed with the mixed neutral rosin carbonates predominating. The quantity of neutral rosin carbonates increases with increased reaction time and increased temperature. Generally, the reaction time may vary from about 1 hour to about 12 hours and will usually reach equilibrium in from about 5 hours to about 10 hours. The temperature may vary from about 100° C. and about 250° C. and usually is between about 150° C. and about 200° C. The concentration of the rosin alcohol ester in benzene or any other suitable solvent may vary from about 10% to about 60% and preferably may be between about 15% and about 30%.

The neutral and mixed neutral rosin carbonates may be prepared by means of an alcohol interchange wherein a rosin alcohol and an ester carbonate of the type hereinbefore referred to are caused to be reacted together in the presence of an effective amount of an alkali metal alcoholate as the catalyst. Where dimethyl carbonate is the ester carbonate used in carrying out the alcohol reaction with a rosin alcohol, methyl alcohol will distill out of the reaction mixture as the reaction progresses under the influence of heat when using sodium methylate as the catalyst. The reaction may be carried out at a temperature between about 60° C. and about 250° C. but is preferably carried out at a temperature between about 100° C. and about 200° C. Generally, the reaction time may vary from about 1 hour to about 12 hours and will usually reach equilibrium in from about 5 hours to about 10 hours. Generally, when the reaction is carried out at the lower temperatures and for a shorter period of time, a greater percentage of the mixed neutral rosin carbonates is formed. When the reaction is carried out at the higher temperatures and for a greater period of time, a greater percentage of neutral rosin carbonates is formed. In either case, a mixture of the neutral and the mixed neutral rosin carbonates is produced when a rosin alcohol and a carbonic acid derivative are caused to be reacted in accordance with the present invention. The concentration of the rosin alcohol in benzene or any other suitable solvent may vary from about 10% to about 60% and preferably may be between about 15% and about 30%.

The neutral rosin carbonates, the mixed neutral rosin carbonates, and the halo rosin carbonates may be prepared by means of an acid halide reaction wherein an acid halide as, for example, a halo formyl halide may be caused to be reacted with a rosin alcohol. The acid halide reaction may be carried out by causing a rosin alcohol or an ester or alcoholic derivative thereof to be reacted with a halo formyl alkyl, aryl, or aralkyl ester. It is preferred to use the rosin alcoholate when carrying out the reaction. A suitable halo formyl ester may be the chloroethyl ester of carbonic acid. It is preferred to use an excess of the chlorocarbonic acid ester, for example, about 25% excess which is slowly added to the rosin alcohol during mild stirring of the mixture. An exothermic reaction takes place with the evolution of a relatively large amount of heat. The resulting solution may be vacuum filtered to remove the sodium chloride precipitate. Excess chlorocarbonic acid ester and solvent may be removed by means of distillation. The time of the reaction may vary from about 3 minutes to about 1 hour but, in general, the reaction will take place in about 10 to about 20 minutes. The reaction temperature may vary from about 10° C. to about 100° C. The proportion of neutral rosin carbonates and halo rosin carbonates in the reaction mixture will depend in part upon the conditions of reaction including temperature, time, and reaction components. Generally, the lower temperatures and relatively shorter periods of reaction time are more conducive to the formation of the halo rosin carbonates than to the formation of the mixed and neutral rosin carbonates. The concentration of the rosin alcohol in benzene or any other suitable solvent may vary from about 10% to about 60% and preferably, may be between about 15% and about 30%.

When the acid halide reaction is carried out using a halo formyl halide and a rosin alcohol, a mixture of halo rosin carbonates, neutral carbonates and mixed neutral carbonates result wherein the neutral rosin carbonates predominate. A preferred halo formyl halide in this reaction is, for example, phosgene, which, when passed through a suitable solvent solution of a rosin alcohol causes the formation of the various rosin carbonates. Ordinarily, when the reaction is carried out at room temperature, a mixture of neutral and halo rosin carbonates is formed wherein the halo rosin carbonates predominate. A greater percentage of the neutral rosin carbonates is formed when the halo formyl halide-rosin alcohol reaction is carried out at the increased reaction temperatures and reaction time. Generally, the time required to carry out the halo-formyl ester-rosin alcohol and the halo-formyl halide rosin alcohol reaction may vary between about ½ hour and about 10 hours but, in general, equilibrium is reached in from about 1 to about 2 hours. The temperature for these two types of reactions may vary from about 10° C. to about 100° C. but the reaction usually takes place at about 20° C. to about 40° C.

The rosin carbonates are useful in the manufacture of adhesive compositions.

What I claim and desire to protect by Letters Patent is:

1. A mixed ester of carbonic acid and a hydrogenated rosin alcohol and an alkyl alcohol.

2. A mixed ester of carbonic acid and a hydrogenated rosin alcohol and methyl alcohol.

3. A method of producing a rosinyl carbonate which comprises reacting a haloformyl halide with a rosin compound selected from a group consisting of a rosin alcohol, its acetate and its alcoholate.

4. A mixed ester of carbonic acid and a polymerized rosin alcohol and an alkyl alcohol.

5. A mixed ester of carbonic acid and an alkyl alcohol and a rosin alcohol selected from the group consisting of a hydrogenated rosin alcohol, polymerized rosin alcohol, dehydrogenated rosin alcohol and heat-treated rosin alcohol.

JOSEPH N. BORGLIN.